United States Patent
Godfrey et al.

(10) Patent No.: US 6,266,797 B1
(45) Date of Patent: *Jul. 24, 2001

(54) DATA TRANSFER NETWORK ON A COMPUTER CHIP USING A RE-CONFIGURABLE PATH MULTIPLE RING TOPOLOGY

(75) Inventors: Gary M. Godfrey, Austin; Alfred C. Hartmann, Round Rock, both of TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,691

(22) Filed: Nov. 14, 1997

Related U.S. Application Data

(63) Continuation-in-part of application No. 08/957,589, filed on Oct. 24, 1997, now Pat. No. 6,111,859, which is a continuation-in-part of application No. 08/783,433, filed on Jan. 16, 1997, now abandoned, which is a continuation-in-part of application No. 08/957,093, filed on Oct. 24, 1997, now Pat. No. 5,908,468.

(51) Int. Cl.$^7$ .................................................. G06F 17/50
(52) U.S. Cl. .................................. 716/1; 716/12; 710/10
(58) Field of Search ........................ 395/500.46, 500.45, 395/200.81, 822.83, 280, 306; 710/116, 126, 129, 100, 131; 703/24, 25; 709/251; 716/12, 13, 14, 1

(56) References Cited

U.S. PATENT DOCUMENTS 4,468,734   8/1984   Lanier et al. ............................. 714/4

(List continued on next page.)

OTHER PUBLICATIONS

Itano,et al "HIRB: A Hierarchical Ring Bus" University of Tsukuba, Japan, Proceedings of the Nineteeth Annual Hawaii International Conference on System Sciences, 1986, pp 206–213.

(List continued on next page.)

Primary Examiner—Matthew S. Smith
Assistant Examiner—Vuthe Siek
(74) Attorney, Agent, or Firm—Conley, Rose & Tayon PC

(57) ABSTRACT

A computer chip including a data transfer network. The data transfer network comprises a plurality of communication ports and a plurality of modules. Each of the communication ports is directly connected to two or more other communication ports, and each of the communication ports is operable to communicate data. Each of the plurality of modules is coupled to at least one of the plurality of communication ports, and the plurality of modules are operable to communicate with each other through the communication ports. Furthermore, the plurality of communication ports are dynamically configurable to form two or more separate communication paths. The plurality of communication ports may be bi-directionally coupled and operable to communicate data with each other. The plurality of communication ports may also be dynamically configurable to form two or more communication rings. A first plurality of communication ports preferably comprise a first communication path, and a second plurality of communication ports comprise a second communication path. A first communication port in the first communication path is connected between two communication ports in the second communication path. The first communication port is then operable to transfer data between the two communication ports in the second communication path. The first plurality of communication ports and the second plurality of communication ports are also dynamically re-configurable to form two or more communication paths. The first plurality of communication ports and the second plurality of communication ports are preferably dynamically re-configurable to form one or more communication rings.

15 Claims, 6 Drawing Sheets

U.S. PATENT DOCUMENTS

| | | | |
|---|---|---|---|
| 4,797,882 | | 1/1989 | Maxemchuk .......................... 370/406 |
| 4,933,933 | | 6/1990 | Dally et al. ........................... 370/406 |
| 4,982,400 | * | 1/1991 | Ebersole ............................ 370/85.15 |
| 5,041,963 | * | 8/1991 | Ebersole et al. ..................... 364/200 |
| 5,191,652 | | 3/1993 | Dias et al. ............................ 709/251 |
| 5,383,191 | | 1/1995 | Hobgood et al. .................... 709/251 |
| 5,394,389 | | 2/1995 | Kremer ................................ 370/223 |
| 5,483,536 | * | 1/1996 | Gunji et al. .......................... 370/403 |
| 5,577,213 | * | 11/1996 | Avery et al. ......................... 710/100 |
| 5,659,781 | * | 8/1997 | Larson ................................... 712/11 |
| 5,671,355 | * | 9/1997 | Collins ................................ 709/250 |
| 5,706,447 | * | 1/1998 | Vivio ................................... 710/129 |
| 5,761,516 | | 6/1998 | Rostoker et al. .................... 710/260 |
| 5,764,930 | * | 6/1998 | Staats .................................. 710/107 |
| 5,771,362 | * | 6/1998 | Bartkowiak et al. ................ 710/132 |
| 5,809,286 | * | 9/1998 | McLain, Jr. et al. .................. 703/23 |
| 5,859,983 | | 1/1999 | Heller et al. ........................ 709/251 |
| 5,872,998 | * | 2/1999 | Chee .................................... 395/876 |
| 5,901,332 | * | 5/1999 | Gephardt et al. ..................... 710/41 |
| 5,908,468 | * | 6/1999 | Hartmann ............................ 710/131 |

OTHER PUBLICATIONS

Kim, et al, "A Relational Dataflow Database Machine Based on Heirarchical Ring Network," Korea Advanced Institute of Technology, Proceedings of the International Conference on Fifth Generation Computer Systems, 1984, pp. 489–496.

Su, et al, "Adaptive Fault–Tolerant Deadlock–Free Routing of the Slotted Ring Muliprocessor," IEEE Transactions on Computers, vol. 45, No. 6, Jun. 1996, pp. 666–683.

Gustavson, D.B., "Scalable Coherent Interface and Related Standards Projects," IEEE vol. 12, No. 1, pp.10–22, Feb. 1992.

Cha, et al, "Simulated Behaviour of Large Scale SCI Rings and Tori," Depts. of Engineering and Computer Science, University of Cambridge, United Kingdom, pp. 1–21, Proceedings of 5th IEEE Symposium on Parallel and Distributed Processing, Dallas, Texas, Dec. 1993.

Franklin, et al, "ARB: A Hardware Mechanism for Dynamic Reordering of Memory References," IEEE Transactions on Computers, vol. 45, No. 5, May 1996, pp. 552–571.

Barroso, et al, "Performance Evaluation of the Slotted Ring Multiprocessor," IEEE Transactions on Computers, vol. 44, No. 7, Jul. 1995, pp. 878–890.

Bhuyan, et al, "Approximate Analysis of Single and Multiple Ring Networks," IEEE Transactions on Computers, vol. 38, No. 7, Jul. 1989, pp.1027–1040.

Arden, et al, "Analysis of Chordal Ring Network," IEEE Transactions on Computers, Vo. C–30, No. 4, Apr. 1981, pp. 291–301.

Kubiatowicz et al, "The Alweife CMMU: Addressing the Multiprocessor Communications Gap," Extended Abstract for Hot Chips '94, 1994, pp. 1–3.

Kubiatowicz et al, "The Anatomy of a Message in the Alewife Multiprocessor," Proceedings of the International Conference on Supercomputing (ICS) 1993, pp. 195–206, Jul. 1993.

* cited by examiner

DATA TRANSFER NETWORK ON A COMPUTER CHIP USING A RE-CONFIGURABLE PATH MULTIPLE RING TOPOLOGY

CONTINUATION DATA

This is a continuation-in-part of U.S. patent application Ser. No. 08/957,589, filed Oct. 24, 1997, titled "Data Transfer Network on a Computer Chip Utilizing Combined Bus and Ring Topologies", whose inventors are Gary Michael Godfrey, J. Andrew Lambrecht and Alfred C. Hartmann, now U.S. Pat. No. 6,111,859; which is a continuation-in-part of application Ser. No. 08/783,433, filed Jan. 16, 1997, entitled "Communication Traffic Circle System and Method for Performing Packet Conversion and Routing Between Different Packet Formats," whose inventor is Alfred C. Hartmann, now abandoned.

This is also a continuation-in-part of application Ser. No. 08/957,093, filed Oct. 24, 1997, titled "Data Transfer Network on a Chip Utilizing A Multiple Traffic Circle Topology", whose inventor is Alfred C. Hartmann, now U.S. Pat. No. 5,908,468.

BACKGROUND OF THE INVENTION

1. Field of the Invention

The present invention relates to computer chip architectures, and more particularly to an on-chip data transfer network which includes a multiple ring architecture with re-configurable paths for improved information routing between multiple on-chip modules.

2. Description of the Related Art

Computer systems have traditionally comprised a system unit or housing which comprises a plurality of electrical components comprising the computer system. A computer system typically includes a motherboard which is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are involving toward comprising a handful of computer chips, where each computer chip comprises a plurality of functions. The integration of a plurality of modules or functions on a single computer chip requires an improved data transfer chip architecture. Also, due to the shorter distances and tighter integration of components on a chip, new data transfer architectures are necessary to take advantage of this environment. Therefore, an improved system and method is desired for including a plurality of different functions or modules on a single computer chip.

SUMMARY OF THE INVENTION

The present invention comprises a computer chip including a data transfer network. The data transfer network comprises a plurality of communication ports and a plurality of modules. Each of the communication ports is directly connected to two or more other communication ports, and each of the communication ports is operable to communicate data. The computer chip includes a plurality of buses connected between each of the communication ports. Each of the plurality of modules is coupled to at least one of the plurality of communication ports, and the plurality of modules are operable to communicate with each other through the communication ports. Furthermore, the plurality of communication ports are dynamically re-configurable to form two or more separate communication paths.

In one embodiment, the plurality of communication ports are bi-directionally coupled and are operable to communicate data with each other. The plurality of communication ports may also be dynamically re-configurable to form two or more communication rings. In another embodiment, a first plurality of communication ports comprise a first communication path, and a second plurality of communication ports comprise a second communication path. A first communication port in the first communication path is connected between two communication ports in the second communication path. The first communication port is then operable to transfer data between the two communication ports in the second communication path.

In another embodiment, the computer chip comprises a first plurality M of communication ports and a second plurality N of communication ports. The first plurality of communication ports are coupled and are operable to communicate data with each other. Likewise, the second plurality of communication ports are coupled and are operable to communicate data with each other. Each of the first plurality of communication ports is coupled to a corresponding one of the second plurality of communication ports. The first plurality of communication ports and the second plurality of communication ports are also dynamically configurable to form two or more communication paths. The first plurality of communication ports may be bi-directionally coupled and operable to communicate data with each other, and the second plurality of communication ports may also be bi-directionally coupled and operable to communicate data with each other. The first plurality of communication ports and the second plurality of communication ports are preferably dynamically re-configurable to form one or more communication rings.

BRIEF DESCRIPTION OF THE DRAWINGS

A better understanding of the present invention can be obtained when the following detailed description of the preferred embodiment is considered in conjunction with the following drawings, in which.

Figure 1:
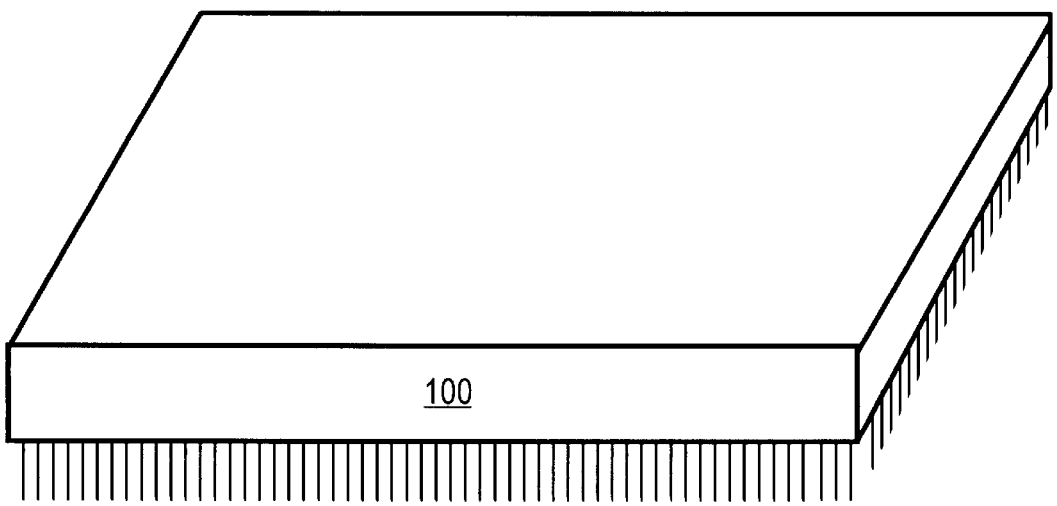
FIG. 1 illustrates a computer chip comprising an on-chip data transfer network according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE EMBODIMENTS

Incorporation by Reference

The following U.S. patent application is hereby incorporated by reference in its entirety as though fully and completely set forth herein.

U.S. patent application Ser. No. 08/969,860, entitled "Variable Latency and Bandwidth Communication Pathways", filed Nov. 14, 1997, whose inventors are J. Andrew Lambrecht and Alfred C. Hartmann, now U.S. Pat. No. 5,935,232.

The present invention comprises an on-chip data transfer network which includes a traffic circle architecture and a bus architecture for improved information routing between multiple on-chip modules. A uniform numbering system is adopted for this application. All components referred to with a common number are to be considered equivalent.

FIG. 1—Computer Chip

Referring now to FIG. 1, a computer chip 100 is shown from a side view. Computer chip 100 preferably comprises a monolithic silicon substrate comprising a plurality of transistors, according to the present invention. The computer chip may also use gallium arsenide (GaAs) or another suitable semiconductor material. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

Computer chip 100 preferably utilizes a generic method for interconnecting multiple module types on a single computer chip 100 using intelligent buffering and a universal port design. Connecting each module to a communications pathway with a full duplex, general purpose communications port allows for heterogeneous and homogeneous module types to form a networked system on a single computer chip. The present invention allows "system on a chip" producers to integrate module designs from different sources or module core vendors This promotes integration of "best of breed" cores from an evolving industry of "virtual component" suppliers. Further details of the components of the computer chip will be given in the descriptions of FIG. 2–4 using the uniform numbering system.

Figure 2A:
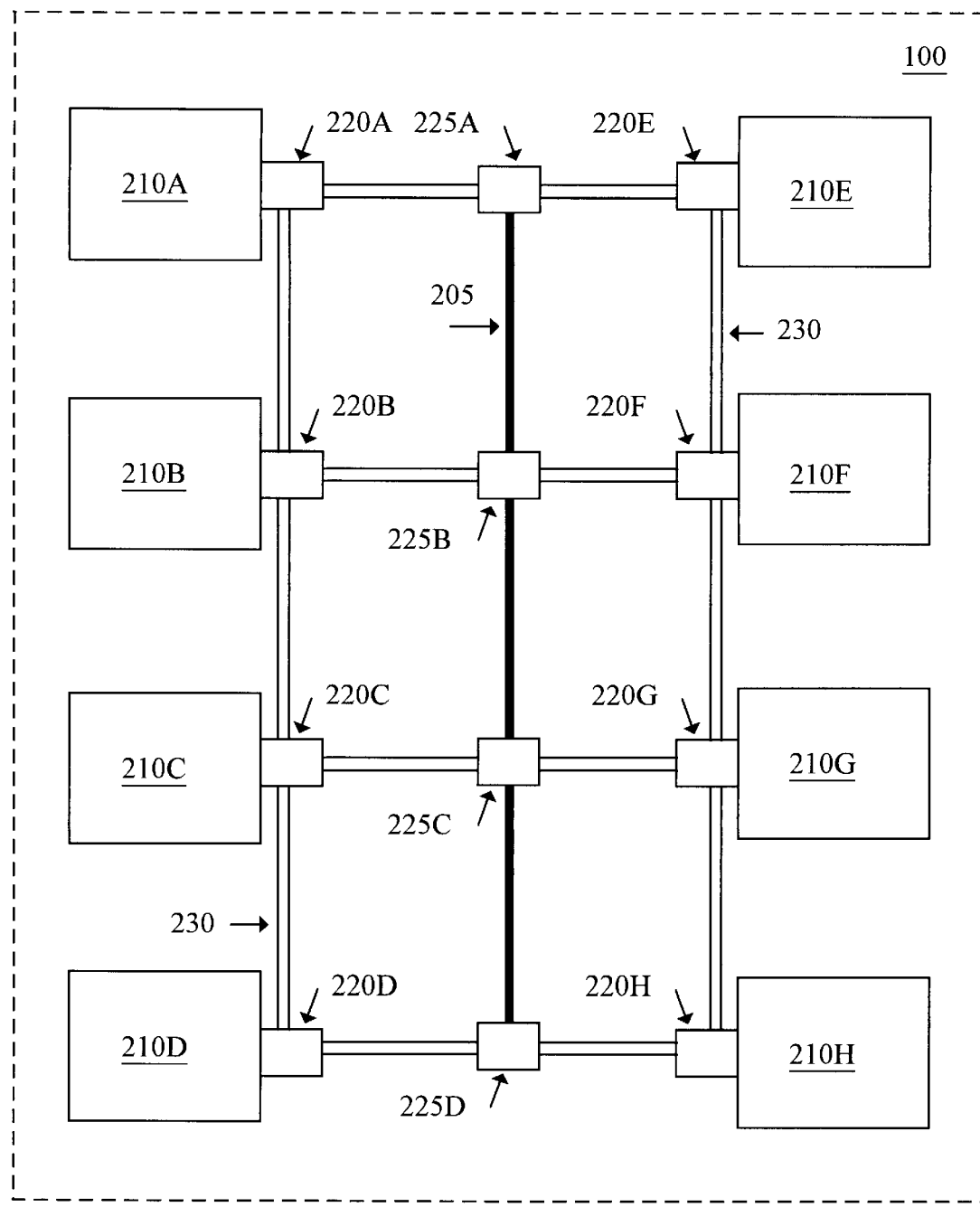
FIG. 2A illustrates an embodiment of the on-chip data transfer network shown in FIG. 1 according to the present invention.

FIG. 2A—On-Chip Data Transfer Network with Backbone Bus

Referring now to FIG. 2A, an embodiment is shown of computer chip 100 with an on-chip data transfer network for interconnecting a plurality of devices or modules 210A–210H linked by a plurality of communication ports 220A–220H on single computer chip 100 in an on-chip data transfer network. The on-chip data transfer network is dynamically re-configurable to form two or more independent, separate communications paths or rings. When a reference is made to module 210 or communication port 220 or 225, that reference may refer to any of the modules 210A–210H or communication ports 220A–220H or 225A–225D, respectively. A reference to circular bus 230 or backbone bus 205 may refer to the entire bus system or to a particular segment or component. The term bus as used in this disclosure is meant to extend to a bus which passes data along its entire physical length during a single transmission, as well as to a transfer link which uses point-to-point data transmission.

The components of the network preferably include a circular bus 230 with the plurality communication ports 220A–220H coupled to the circular bus 230 as well as a backbone bus 205 with a plurality of communication ports 225A–225D coupled to the backbone bus 205 and the circular bus 230. The circular bus 203 is comprised of the individual buses connecting between and among ports 220A–220H. Communications ports 225 are a subset of the plurality of communication ports 220 operable to transmit and receive data on either the backbone bus 205 and/or the circular bus 230. Each of the plurality of modules 210 is coupled to at least one of the plurality of communication ports 220. In various embodiments, communication ports 220 and modules 210 are either directly connected or completely integrated as a single unit. The plurality of modules 210 are configurable to communicate with each other through the communication ports 220. Modules 210 preferably perform operations, like a processor or an I/O controller, or storage like a memory, or multiple tasks, like a task specific hybrid (ASIC) or a task general hybrid.

Starting on the left side of FIG. 2A, moving top to bottom, modules 210A–210D are respectively coupled to the circular bus 230 via communication ports 220A–220D. In the center, communication ports 225A–225D are coupled to the circular bus 230 and the backbone bus 205. On the right side of the figure modules 210E–210H are coupled to the circular bus 230 via communication ports 220E–220H. Communication ports 220A and 220E are electrically coupled to communication port 225A by circular bus 230. Likewise, communication port pairs 220B and 220F are electrically coupled to communication port 225B, communication port pairs 220C and 220G are electrically coupled to communication port 225C, and communication port pairs 220D and 22011 are electrically coupled to communication port 225D by circular bus 230.

One embodiment of computer chip 100 includes communication ports 220 divided into a first plurality of communication ports 220A–220D coupled to a first side of the backbone bus 205 through communication ports 225, and a second plurality of communication ports 220E–220H coupled to a second side of the backbone bus 205 through communication ports 225. The first plurality of communication ports 220A–220D are electrically coupled forming a first portion of the circular bus 230, and the second plurality of communication ports 220E–220H are electrically coupled forming a second portion of circular bus 230. The first plurality of communication ports 220A–220D includes a first communication port 220A and a last communication port 220D). The second plurality of communication port 220E–220H also includes a first communication port 220E and a last communication port 220H. The first communication port 220A of the first plurality of communication ports 220A–220D is coupled to the first communication port 220E of the second plurality of communication ports 220E–220H through communication port 225A. The last communication port 220D of the first plurality of communication ports 220A–220D is coupled to the last communication port 220H of the second plurality of communication ports 220E–220H through communication port 225D, thereby forming circular bus 230 between the first and second pluralities of communication ports 220A–220H. Other connections between the first and second pluralities of communication ports 220 are contemplated in a similar fashion.

Although FIG. 2A shows eight communication ports 220 electrically coupled for information transmission on a circular bus 230 along with four communication ports 225, one skilled in the art could add or subtract from these numbers as desired. Additionally, FIG. 2A shows each module 210 coupled to the circular bus 230 by only one communication port 220, one skilled in the art might also choose to connect a particular module 210 to more than one point on circular bus 230 and/or one or more places on the backbone bus 205. For each coupling of objects or means, the coupling could be electrical, optical or mechanical as desired.

In the configuration shown in FIG. 2A the first plurality of communication ports 220A–220D coupled to the first side of the backbone bus 205 through the communication ports 225 are operable to communicate over the backbone bus 205 to one or more of either the first plurality of communication ports 220A–220D or the second plurality of communication ports 220E–220H coupled to the second side of the backbone bus 205 through the communication ports 225. Likewise, one or more of the second plurality communication ports 220E–220H coupled to the second side of the backbone bus 205 through the communication ports 225 are operable to communicate over the backbone bus 205 to one or more of the first plurality of communication ports 220A–220D coupled to the first side of the backbone bus 205 through the communication ports 225.

One or more of the first plurality of communication ports 220A–220D are also operable to communicate over the circular bus 230 to one or more of the second plurality of communication ports 220F–220H. Likewise, one or more of the second plurality of communication ports 220E–220H are operable to communicate over the circular bus 230 to one or more of the first plurality of communication ports 220E–220H. Each of the first plurality communication ports 220A–220D and the second plurality of communication ports 220E–220H are preferably operable to selectively communicate over the backbone bus 205 through the communication ports 225 and/or the circular bus 230.

The data transfer network of computer chip 100 is operable in either a first mode or a second mode. Each of the first plurality of communication ports 220A–220D and the second plurality of communication ports 220E–220H may communicate in the first mode using only the circular bus or the second mode using both the backbone bus and the circular bus. One or more of the backbone bus 205 and the circular bus 230 may include addressing and/or control lines (not shown). In the embodiment of FIG. 2A, the backbone bus 205 is preferably a true bus and circular bus 230 is preferably a network of transfer links. Additional details concerning FIG. 2A are disclosed elsewhere under the uniform numbering system.

Figure 2B:
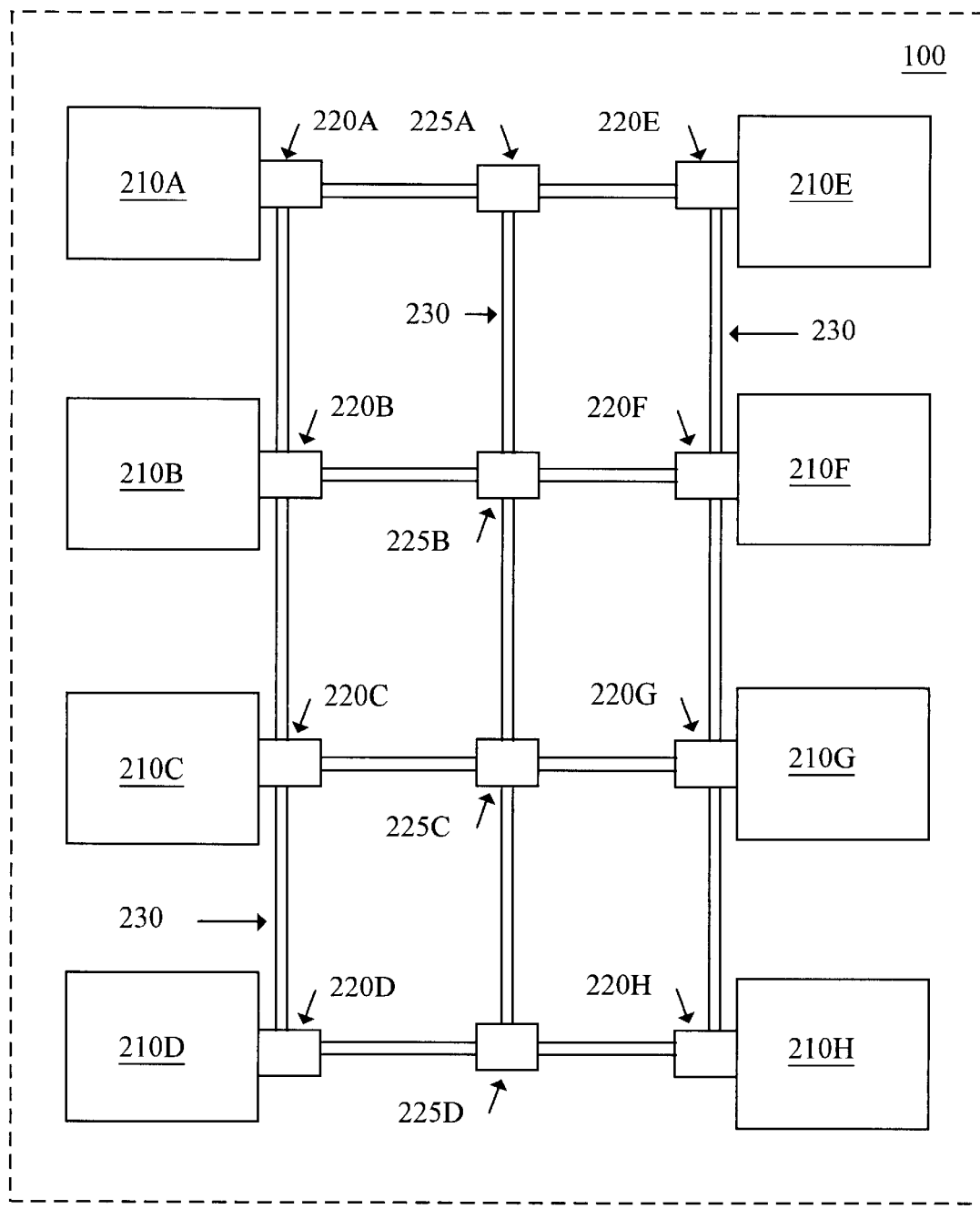
FIG. 2B illustrates another embodiment of the on-chip network shown in FIG. 1 according to the present invention.

FIG. 2B—Data Transfer Network

Referring now to FIG. 2B, another embodiment of computer chip 100 with an on-chip data transfer network is shown for interconnecting a plurality of devices or modules 210A–210H linked by a plurality of communication ports 220A–220H on single computer chip 100. The components of the network preferably include a circular bus 230 with the plurality communication ports 220A–220H coupled to the circular bus 230 as well as a plurality of communication ports 225A–225D coupled to segments of the circular bus 230. The circular bus 203 is comprised of the individual buses connecting between and among ports 220A–220H and/or ports 225A–225D. Communications ports 225 are preferably a subset of the plurality of communication ports 220 operable to transmit and receive data only on the circular bus 230.

Each of the plurality of modules 210 is coupled to at least one of the plurality of communication ports 220. In various embodiments, communication ports 220 and modules 210 are either directly connected or completely integrated as a single unit. The plurality of modules 210 are configurable to communicate with each other through the communication ports 220. Modules 210 preferably perform operations, like a processor or an I/O controller, or storage like a memory, or a hybrid task, like a task specific hybrid (ASIC) or a task general hybrid.

Starting on the left side of FIG. 2B, moving top to bottom, modules 210A–210D are respectively coupled to the circular bus 230 via communication ports 220A–220D. In the center, communication ports 225A–225D are coupled to segments of the circular bus 230. On the right side of the figure modules 210E–210H are coupled to the circular bus 230 via communication ports 220E–22011. Communication ports 220A and 220E are electrically coupled to communication port 225A by circular bus 230. Likewise, communication port pairs 220B and 220F are electrically coupled to communication port 225B, communication port pairs 220C and 220G are electrically coupled to communication port 225C, and communication port pairs 220D and 220H are electrically coupled to communication port 225D by segments of circular bus 230.

One embodiment of computer chip 100 includes communication ports 220 divided into a first plurality of communication ports 220A–220D coupled to a first side of the plurality of communication ports 225, and a second plurality of communication ports 220E–220H coupled to a second side of the plurality of communication ports 225. The first plurality of communication ports 220A–220D) are electrically coupled forming a first portion of the circular bus 230, and the second plurality of communication ports 220E–220H are electrically coupled forming a second portion of circular bus 230. The plurality of communication ports 225A–225D are electrically coupled forming a third portion of circular bus 230. The first plurality of communication ports 220A–220D includes a first communication port 220A and a last communication port 220D. The second plurality of communication port 220E–220H also includes a first communication port 220E and a last communication port 220H. The first communication port 220A of the first plurality of communication ports 220A–220D is coupled to the first communication port 220E of the second plurality of communication ports 220E–220H through communication port 225A. The last communication port 220D of the first plurality of communication ports 220A–220D is coupled to the last communication port 220H of the second plurality of communication ports 220E–220H through communication port 225D, thereby forming circular bus 230 between the first and second pluralities of communication ports 220A–220H. Other connections between the first and second pluralities of communication ports 220 are also possible in a similar fashion.

Although FIG. 2B shows eight communication ports 220 electrically coupled for information transmission on a circular bus 230 along with four communication ports 225, one skilled in the art could add or subtract from these numbers as desired. Additionally, FIG. 2B shows each module 210 coupled to the circular bus 230 by only one communication port 220, one skilled in the art might also choose to connect a particular module 210 to more than one place on circular bus 230 through one or more additional communications ports 220 or 225. For each coupling of objects or means, the coupling could be electrical, optical or mechanical as desired.

The plurality of buses 230 coupled between the plurality of communications ports 220 and/or 225 are operable to dynamically select different ones of the buses 230 to dynamically form one or more separate communication paths. These communication paths may cross each other, and some communications ports 220 and/or 225 may be included in more than one communication path concurrently. The grid-like shape shown in FIG. 2B, for example, may be expanded to form any geometry or hyper-geometric representation. As an example, more columns of communications ports 225 coupled via buses 230 may be added to provide additional nexus points for the re-configurable communication paths. Each communications port 220 and/or 225 preferably includes configuration logic 360 which either controls the re-configurable communication paths or accepts configuration input from the modules 210 or other, possibly off chip, masters.

In the configuration shown in FIG. 2B the first plurality of communication ports 220A–220D coupled to the plurality of communication ports 225 are operable to communicate over the backbone bus 205 to one or more of either the first plurality of communication ports 220A–220D or the second plurality of communication ports 220E–220H coupled to the plurality of communication ports 225. Likewise, one or more of the second plurality communication ports 220E–220H coupled to the plurality of communication ports 225 are operable to communicate over the circular bus 230 to one or more of the first plurality of communication ports 220A–220D coupled to the plurality of communication ports 225. Each of the first plurality communication ports 220A–220D), the second plurality of communication ports 220E–220H, and the plurality of communication ports 225A–225D are preferably operable to selectively communicate over any of the segments of the circular bus 230. The circular bus 230 may include addressing and/or control lines (not shown). In the embodiment of FIG. 2B, the circular bus 230 is preferably a network of transfer links. Additional details concerning FIG. 2B are disclosed elsewhere under the uniform numbering system.

Figure 3A:
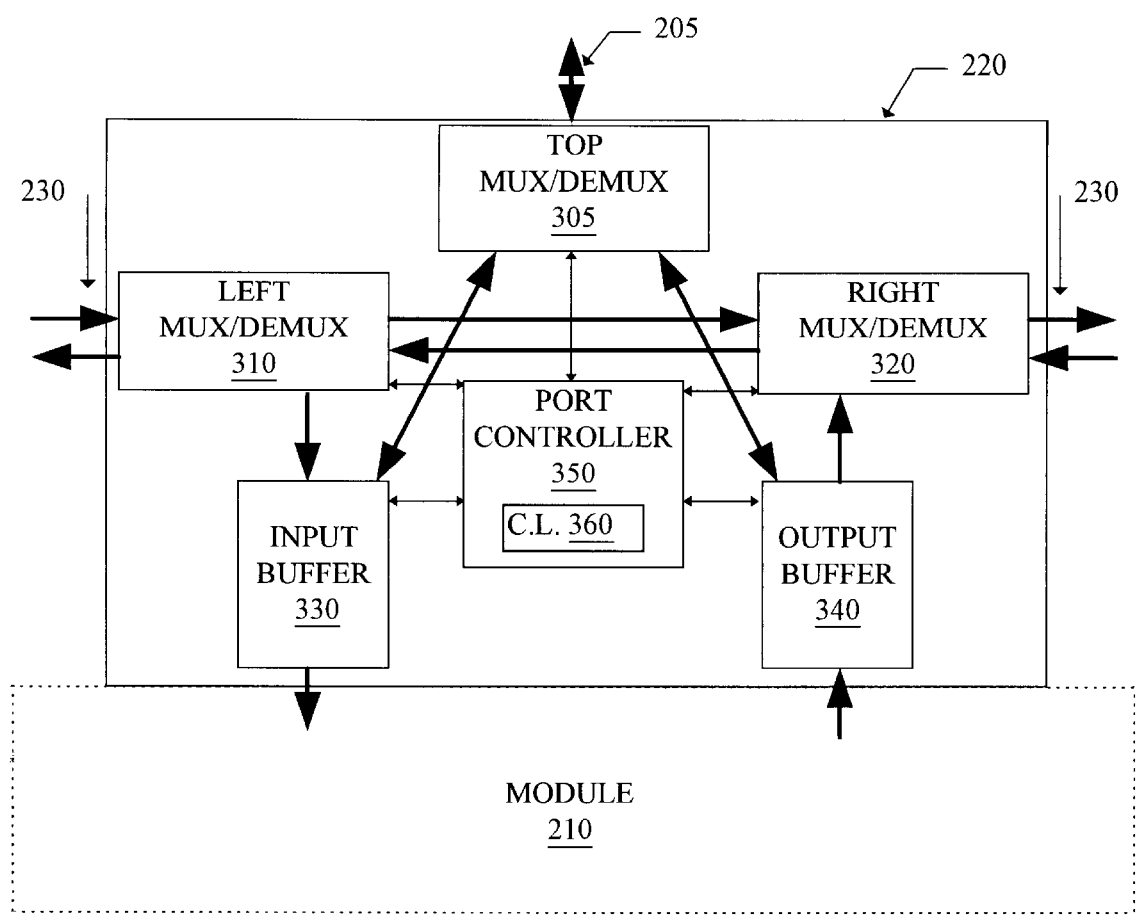
FIG. 3A illustrates an embodiment of a communication port shown in FIG. 1 according to the present invention.

FIG. 3A—Communication Port

Referring now to FIG. 3A, an embodiment of communication port 220 is shown along with the couplings between communication port 220 and circular bus 230. Although communication port 220 is shown as a separate item from module 210, in another embodiment communication port 220 may be incorporated into module 210. Preferably included as components of communication port 220 are top multiplexer(MUX)/demultiplexer(DEMUX) 305 coupled to one segment of the circular bus 230, a pair of MUX/DEMUXs, left MUX/DEMUX 310 and right MUX/DEMUX 320, each coupled to other segments of circular bus 230, input buffer 330, output buffer 340 and port controller 350. Left MUX/DEMUX 310 and right MUX/DEMUX 320 are coupled together. Left MUX/DEMUX 310 is further coupled to input buffer 330 which is further coupled to module 210. Right MUX/DEMUX 320 is further coupled to output buffer 340 which is also coupled to module 210.

Operations of communication port 220 are preferably controlled by the port controller 350 which preferably includes circular bus interface logic (not shown) and configuration logic 360 for selectively routing data between and/or among the various buses, including the circular bus 230 and the backbone bus 205. All included components of port controller 350 may also be comprised in module 210 or a separate part of computer chip 100. In a preferred embodiment, port controller 350, including circular bus interface logic and configuration logic 360, is coupled to various segments of the circular bus 230. As shown in FIG. 5 the port controller 350 issues communications and/or commands to top MUX/DEMUX 305, left MUX/DEMUX 310, right MUX/DEMUX 320, input buffer 330 and output buffer 340. In addition top MUX/DEMUX 305 is coupled to input buffer 330 and output buffer 340. Controller 350 is preferably operable to control transfer of data to and from one segment of circular bus 230 and module 210 by way of top MUX/DEMUX 305 via input buffer 330 and output buffer 340. Port control 350 is also preferably operable to control information transfer between other segments of circular bus 230 and module 210 by regulating transfer of data from module 210 to output buffer 340 through the right MUX/DEMUX 320 and onto circular bus 230. In this embodiment port controller 350 controls transfer of data from the various segments of the circular bus 230 to other various segments of the circular bus 230 through transfer of data from top MUX/DEMUX 305 to output buffer 340 through right MUX/DEMUX 320 and then onto circular bus 230. Optionally, right MUX/DEMUX 320 can routed data through left MUX/DEMUX 310 before it is transferred to circular bus 230. The reverse data transfers are also possible.

Input buffer 330 and output buffer 340 may also be comprised as part of module 210. Top MUX/DEMUX 305, left MUX/DEMUX 310, and right MUX/DEMUX 320, input buffer 330 and output buffer 340 may interchangeably be data transfer buffers and/or multiplexers and/or demultiplexers. Each communication port 220 preferably includes one or more data transfer buffers. At least a first portion of the one or more data transfer buffers is coupled to the circular bus interface logic that is preferably part of port controller 350. The first portion of the one or more data transfer buffers is configurable to communicate information between the module 210 and the various segments of the circular bus 230. A second portion of the one or more data transfer buffers is coupled to the circular bus interface logic preferably included in port controller 350. The second portion of the one or more data transfer buffers is configurable configurable to communicate information among the various segments of the circular bus 230.

In another embodiment, computer chip 100 includes an additional plurality of buffers with each of the buffers coupled between their respective communication port 220 and the circular bus 205. These plurality of buffers are operable for buffering data between a respective communication port 220 and the circular bus 230. Additional details concerning FIG. 3A are disclosed elsewhere under the uniform numbering system.

Figure 3B:
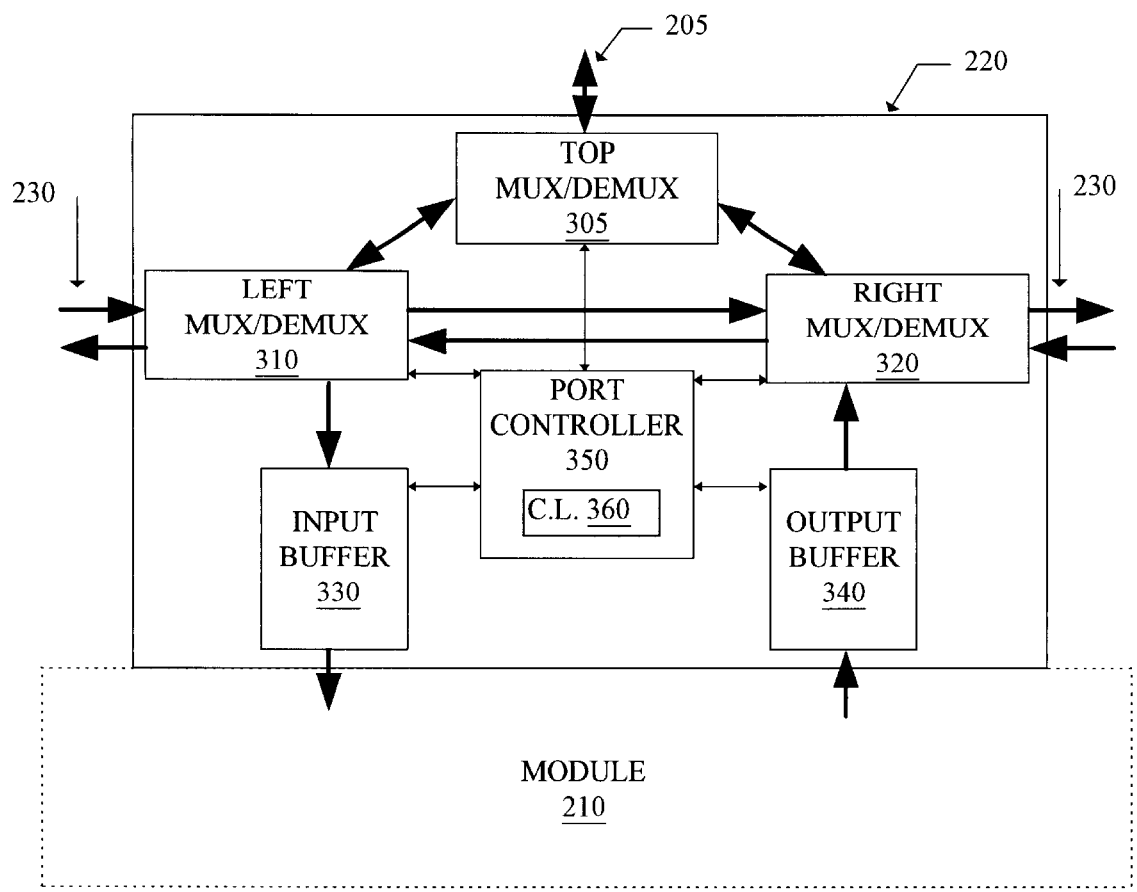
FIG. 3B illustrates another embodiment of a communication port shown in FIG. 1 according to the present invention.

FIG. 3B—Another Communications Port

Referring now to FIG. 3B, an embodiment is shown of communications port 220 wherein data transfers among the circular bus 230 and the module 210 are made from top MUX/DEMUX 305 directly to and from left MUX/DEMUX 310 and/or right MUX/DEMUX 320. In this embodiment top MUX/DEMUJX 305 is not connecting to input buffer 330 or output buffer 340. Otherwise the components, operations and designations in FIG. 3B are the same as FIG. 3A. Additional details concerning FIG. 3B are disclosed elsewhere under the uniform numbering system.

Figure 4:
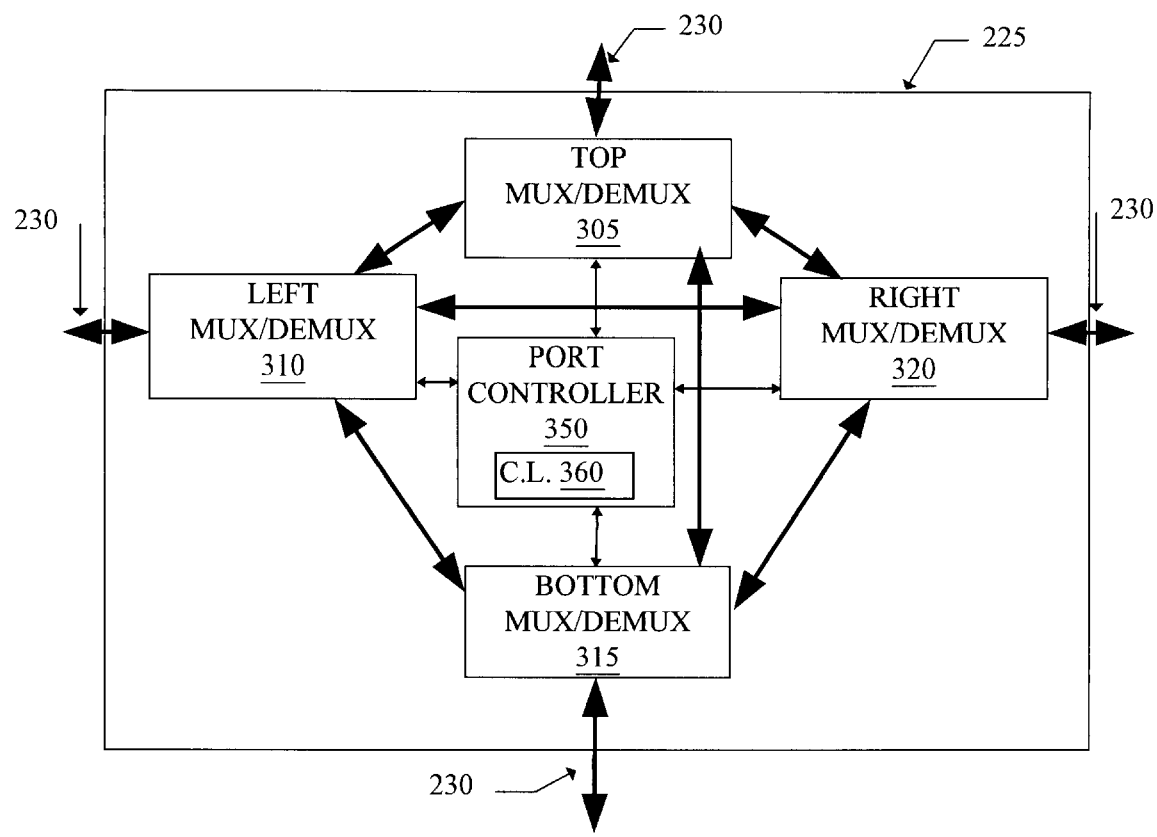
FIG. 4 illustrates a different embodiment of a communication port according to the present invention.

FIG. 4—Four Way Communications Port

Referring now to FIG. 4, an embodiment is shown of communications port 225 for data transfers among the various segments of the circular bus 230 and possibly the backbone bus 205. The illustrated embodiment is similar in design to the embodiment of communications port 220 shown in FIG. 3B with the input buffer 330 and the output buffer 340 replaced by a bottom MUX/DEMUX 315 coupled to the top MUX/DEMUX 305, left MUX/DEMUX 310 and right MUX/DEMUX 320. Control of the bottom MUJX/DEMUJX 315 is preferably by the port controller 350 as shown.

Communications port 225 is shown with all four units 305, 310, 315, and 320 coupled to four segments of the circular bus 230. Alternatively, top MIJX/DEMUX 305 and/or bottom MUX/DEMUX 315 is coupled to the backbone bus 205 or a module 210. Configured coupled to one or more of the modules 210, communications port 225 becomes an embodiment of communications port 220. Otherwise the components, operations and designations in FIG. 4 are the same as FIGS. 3A and 3B. Additional details concerning FIG. 4 are disclosed elsewhere under the uniform numbering system.

Conclusion

Although the system of the present invention has been described in connection with the preferred and various embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A single monolithic computer chip comprising a data transfer network, the computer chip comprising:

a plurality of communication ports comprised on said single monolithic computer chip, wherein each of said communication ports are directly connected to two or more other communication ports to form two or more communications paths, wherein each of said communication ports are operable to communicate data, wherein said two or more communication paths comprise intra-chip communication paths; and a plurality of modules comprised on said single monolithic computer chip, wherein each of said plurality of modules is coupled to at least one of said plurality of communication ports, and wherein said plurality of modules comprise one or more of a processor, an I/O controller, a memory, or a task specific hybrid integrated circuit;

wherein the single monolithic computer chip is dynamically configurable to form a first communication path between a first communication port and a second communication port during a first time period and is dynamically configurable to form a second communication path between the first communication port and a third communication port during a second time period, wherein said first communication path and said second communication path comprise intra-chip communication paths.

2. The single monolithic computer chip of claim 1, further comprising:

a plurality of buses comprised on said computer chip and coupled between said plurality of communications ports; wherein said plurality of ports are operable to dynamically select different ones of said buses to dynamically form said communication paths.

3. The single monolithic computer chip of claim 2, wherein each of said communication ports includes configuration logic for dynamically configuring said buses to form said first communication path in said first instance and said second different communication path in said second instance.

4. The single monolithic computer chip of claim 3, wherein said first communication path and said second different communication path are coupled to each other to allow communication ports connected to said first communication path to communicate data to communication ports connected to said second different communication path.

5. The single monolithic computer chip of claim 2, wherein a first bus included in said plurality of buses comprises an address line and a control line.

6. The single monolithic computer chip of claim 1, wherein said plurality of communication ports are bi-directionally coupled and are operable to communicate data with each other.

7. The single monolithic computer chip of claim 6, wherein said plurality of communication ports are dynamically configurable to form two or more isolated communication rings.

8. The single monolithic computer chip of claim 7, wherein the plurality of communication ports include a first plurality of communication ports and a second plurality of communication ports, wherein the first plurality of communication ports comprise said first communication path, and wherein the second plurality of communication ports comprise said second different communication path;

wherein at least one of the first plurality of communication ports comprised in said first communication path is connected between two communication ports in said second communication path;

wherein said at least one of the first plurality of communication ports is operable to transfer data between said two communication ports in said second communication path; and wherein said first and second pluralities of communication ports are re-configurable to form different communication paths.

9. The single monolithic computer chip of claim 6, wherein each communication port in a communication path is operable to perform bi-directional communications with every other communication port in said communication path.

10. The single monolithic computer chip of claim 1, wherein the plurality of communication ports include a first plurality of communication ports and a second plurality of communication ports, wherein the first plurality of communication ports comprise said first communication path, and wherein the second plurality of communication ports comprise said second different communication path;

wherein one of said first plurality of communication ports is operable to communicate to with one of said second plurality of communication ports.

11. The single monolithic computer chip of claim 1, wherein said plurality of communication ports comprises a first plurality of communication ports and a second plurality of communication ports;

wherein said first plurality of communication ports are directly electrically coupled, and wherein said second plurality of communication ports are directly electrically coupled;

wherein said first plurality of communication ports includes a first communication port and a last communication port, and wherein said second plurality of communication ports includes a first communication port and a last communication port;

wherein said first communication port of said first plurality of communication ports is coupled to said first communication port of said second plurality of communication ports, and wherein said last communication port of said first plurality of communication ports is coupled to said last communication port of said second plurality of communication ports.

12. The single monolithic computer chip of claim 1, wherein a first communication port included in said plurality of communication ports is configured to be included in more than one said communication paths concurrently.

13. A single monolithic computer chip comprising a data transfer network, the computer chip comprising:

a first plurality M of communication ports comprised on said single monolithic computer chip, wherein said first plurality of communication ports are directly coupled and are operable to communicate data with each other; and a second plurality N of communication ports comprised on said single monolithic computer chip, wherein said second plurality of communication ports are directly coupled and are operable to communicate data with each other;

a plurality of modules comprised on said single monolithic computer chip, wherein each of said plurality of modules is coupled to at least one of said plurality of communication ports; and wherein said plurality of modules comprise one or more of a processor, an I/O controller, a memory, or a task specific hybrid integrated circuit;

wherein each of said first plurality M of communication ports is coupled to a corresponding one of said second plurality N of communication ports;

wherein the single monolithic computer chip is dynamically configurable to form a first communication path between a first subset of the first plurality M of communication ports and a first subset of the second plurality N of communication ports during a first time period and is dynamically configurable to form a second communication path between the first subset of the first plurality M of communication ports and a second subset of the second plurality N of communication ports during a second time period, wherein said first communication path and said second communication path comprise intra-chip communication paths.

14. The single monolithic computer chip of claim 13, wherein said first plurality M of communication ports are bi-directionally coupled and are operable to communicate data with each other;

wherein said second plurality N of communication ports are bi-directionally coupled and are operable to communicate data with each other.

15. The single monolithic computer chip of claim 14, wherein said first plurality M of communication ports and said second plurality N of communication ports are dynamically re-configurable to form one or more isolated communication rings.

* * * * *